United States Patent [19]

Washizu et al.

[11] Patent Number: 5,092,632
[45] Date of Patent: Mar. 3, 1992

[54] STRUCTURE FOR COUPLING RESIN TUBES BY THE USE OF A BRACKET

[75] Inventors: Katsushi Washizu, Numazu; Yuuji Miyauchi, Shizuoka, both of Japan

[73] Assignee: Usui Kokusai Sangyo Kaisha, Ltd., Japan

[21] Appl. No.: 671,388

[22] Filed: Mar. 19, 1991

[51] Int. Cl.$^5$ .............................................. F16L 3/00
[52] U.S. Cl. ........................................ 285/62; 285/49; 285/292; 285/371
[58] Field of Search ................. 285/62, 398, 371, 292, 285/49

[56] References Cited

U.S. PATENT DOCUMENTS

| | | | |
|---|---|---|---|
| 300,005 | 6/1884 | Patterson | 285/398 X |
| 3,565,465 | 2/1971 | Wemyss | 285/371 X |
| 4,147,381 | 4/1979 | Schwarz | 285/371 X |
| 4,840,408 | 6/1989 | Nishiki et al. | 285/62 |
| 4,997,213 | 3/1991 | Traner et al. | 285/292 X |
| 4,998,337 | 3/1991 | Trekink | 285/292 X |

Primary Examiner—Dave W. Arola
Attorney, Agent, or Firm—Anthony J. Casella; Gerald E. Hespos

[57] ABSTRACT

A structure for coupling resin tubes by the use of a bracket, comprises tubes made of resin, a pipe or insert made of metal and inserted into one end of the tubes, and a bracket made of resin and surrounding the insert and the tubes where the insert is inserted upon injection molding of the bracket. The tubes are coupled with a clearance left therebetween. The metal insert extends radially and outwardly to provide annular projections where it is inserted into the one ends of the resin tubes. Also, the metal insert has opposite end extending beyond axial ends of the bracket.

1 Claim, 1 Drawing Sheet

PRIOR ART

STRUCTURE FOR COUPLING RESIN TUBES BY THE USE OF A BRACKET

BACKGROUND OF THE INVENTION

1. Field of the Invention

The present invention relates to an improvement in coupling of resin tubes by a bracket, the tubes generally serving to supply oil or gas to an automotive vehicle or other machines and instruments and having a relatively small diameter, for example, less than 20 m/m.

2. Description of the Related Art

A typical conventional coupling structure of this type is shown in FIG. 3. An elongate metal sheet or bracket 11 has one end curled to provide a circular gripping wall 13 with a slight clearance and the other or mounting end attached to a base. The gripping wall 13 receives two resinous tubes 12 to grip or hold the periphery of the tubes 12.

In the prior art, the gripping wall 13 of the bracket 11 is fabricated before the tubes are coupled. However, this results not only in cumbersome coupling of the resinous tubes 12, but also collapse or deformation of the tubes where they are coupled. In addition, the tubes may be displaced relative to one another due to vibrations of machines or instruments into which the tubes are incorporated. Such relative displacement of the tubes may cause scuffing and consequent breakage of the tubes. The prior art bracket is generally unable to safely couple the tubes together.

SUMMARY OF THE INVENTION

With the foregoing in mind, it is an object of the present invention to provide a structure for coupling resin tubes by a bracket, which eliminates cumbersome coupling of resin tubes so as to provide a simple coupling and at the same time, prevents collapse and deformation of the resin tubes, and which effectively prevents axial and circumferential displacement of the tubes due to vibrations after coupling has been effected so as to eliminate scuffing of the outer peripheral surfaces of the tubes and insure safe coupling of same.

In order to achieve the foregoing object, there is provided a structure for coupling resin tubes by a bracket, which comprises separate resin tubes of a small diameter, a short metal pipe of a small diameter inserted into one ends of the resin tubes, preferably with a clearance left therebetween, and a bracket made of resin and surrounding the metal pipe and the resin tubes where the metal pipe is inserted upon injection molding of the bracket. The metal pipe extends outwardly to provide annular projections where it is fit over the resin tubes. Also, the metal pipe has opposite ends extending beyond ends of the bracket.

In the present invention, the bracket surrounds the metal pipe and the tubes where the metal pipe is inserted. This arrangement eliminates cumbersome connection of the resin tubes to the bracket and provides a simple coupling. The resin tubes are not subject to collapse and deformation at a portion where they are fixed. Since part of the metal pipe is directly attached, the resin tubes are effectively prevented not only from axial and circumferential displacement, but also from scuffing. The resin tubes are thus safely coupled by the bracket. This coupling is further improved when the ends of the resin tubes are coupled with a clearance left therebetween.

BRIEF DESCRIPTION OF THE DRAWINGS

For a better understanding of the invention, reference may be had to the following description of preferred embodiments when taken in conjunction with the accompanying drawings, in which.

DESCRIPTION OF THE PREFERRED EMBODIMENTS

Figure 1:
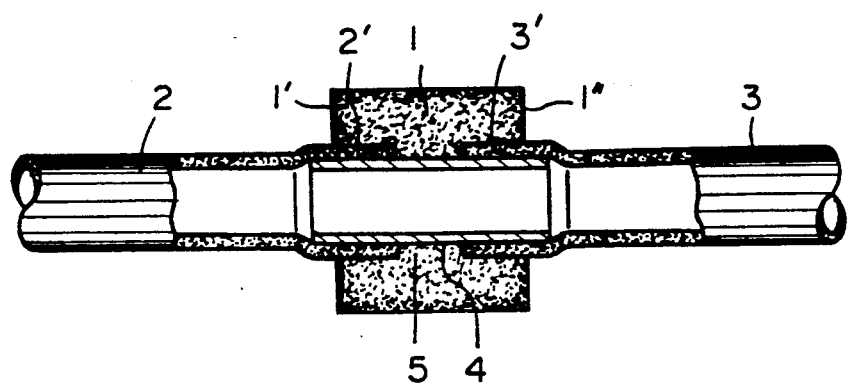
FIG. 1 is a plan view of a bracket according to one embodiment of the present invention, with two tubes, partly broken away, being coupled together by the bracket.
Figure 2:
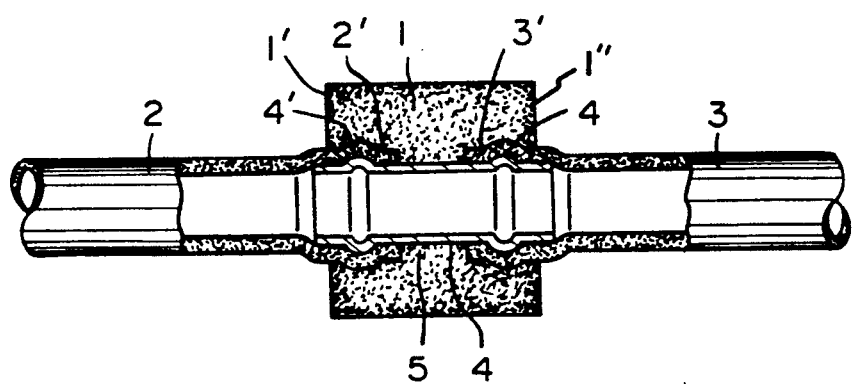
FIG. 2 is a view similar to FIG. 1, but showing another embodiment of the present invention.
Figure 3:
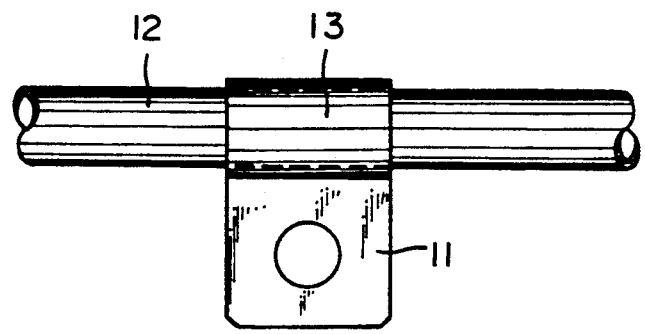
FIG. 3 is a plan view of a conventional bracket.

With now reference to FIGS. 1 and 2, the reference numeral 1 designates a bracket made of nylon, polyethylene, polypropylene, acetal, ABS or other thermoplastic resin by means of injection molding. 2 and 3 are two separate tubes made of resin and having a relatively small diameter, for example, less than 20 m/m. A short pipe 4 of a small diameter is inserted into one ends 2' and 3' of the tubes 2 and 3 so as to join the tubes 2 and 3 with a clearance 5 left therebetween. The pipe 4 is embedded in the bracket 4 when the latter s made by injection molding.

As illustrated, opposite ends of the pipe 4 project beyond end surfaces 1' and 1" of the bracket 1 so as to prevent collapse of the resin tubes due to high pressure produced in the course of injection molding thermoplastic resin.

FIG. 2 illustrates another embodiment of the present invention. Each pipe 4 has one end extending radially and outwardly from the peripheral surface to provide an annular projection 4". This arrangement improves coupling of the pipe 4 and the ends 2' and 3' of the tubes 2 and 3.

In the foregoing embodiments, two tubes are linearly coupled together. It is, of course, understood that a plurality of tubes may be coupled in a parallel fashion.

With the coupling structure of the present invention thus far described, the metal pipe 4 extending between the tubes is embedded in the bracket 1 simultaneously with injection molding of the bracket 1. This arrangement not only eliminates cumbersome coupling of the resin tubes to provide a simple coupling, but also prevents collapse and deformation where they are coupled together. In addition, the tubes 2 and 3 are not subject to axial or circumferential displacement due to vibrations and thus, consequent scuffing and breakage. Accordingly, the tubes are safely coupled together by the bracket. This coupling can be further improved by inserting the metal pipe 4 into the ends 2' and 3' of the resin tubes 2 and 3 with clearance 5 left therebetween. The present invention provides a useful structure for coupling resin tubes by the use of a bracket.

Although preferred embodiments of the present invention have been described in detail, it will be understood that various changes and modifications may be made therein without departing from the spirit and scope of the invention.

what is claimed is:

1. A structure for coupling resin tubes in axial alignment comprising:
    a metal pipe having opposed first and second axially aligned cylindrical end sections, first and second outwardly extending annular projections disposed inwardly from and adjacent the respective first and second cylindrical end sections and an axially aligned cylindrical center section extending between the first and second annular projections;

first and second resin tubes having ends mounted over the respective first and second cylindrical end sections and over the first and second annular projections of the pipe such that the ends of the first and second resin tubes are disposed at locations spaced from one another and along the axially aligned center section of the pipe, portions of the first and second resin tubes separated from the ends being deformed annularly outwardly by the respective first and second annular projections of the metal pipe; and a molded resin bracket surrounding and engaging portions of the resin tubes and the metal pipe, and extending continuously from a first location along the first cylindrical end section of the metal pipe to a second location along the second cylindrical end section of the metal pipe such that portions of the first and second cylindrical end sections of the metal pipe and portions of the first and second resin tubes mounted thereon are external of the molded resin bracket, whereby the molded resin bracket securely retains the resin tubes on the metal pipe and prevents axial shifting thereof, and whereby the disposition of portions of the first and second cylindrical end sections of the metal pipe external of the molded resin bracket prevents collapsing of the first and second resin tubes during molding of the resin bracket.

* * * * *